(12) United States Patent
Ishikawa

(10) Patent No.: US 12,007,002 B2
(45) Date of Patent: Jun. 11, 2024

(54) POWER TRANSMISSION DEVICE

(71) Applicant: Honda Motor Co., Ltd., Tokyo (JP)

(72) Inventor: Tetsuya Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/177,114

(22) Filed: Mar. 2, 2023

(65) Prior Publication Data
US 2023/0279929 A1    Sep. 7, 2023

(30) Foreign Application Priority Data

Mar. 4, 2022 (JP) .................................. 2022-033433

(51) Int. Cl.
| F16H 19/08 | (2006.01) |
| B25J 9/10  | (2006.01) |
| B25J 17/02 | (2006.01) |

(52) U.S. Cl.
CPC .......... *F16H 19/08* (2013.01); *B25J 17/0258* (2013.01); *B25J 9/104* (2013.01); *F16H 2019/085* (2013.01)

(58) Field of Classification Search
CPC .... F16H 19/08; F16H 2019/085; B25J 9/104; B25J 17/0258
See application file for complete search history.

(56) References Cited

U.S. PATENT DOCUMENTS

| 5,697,256 A | * | 12/1997 | Matteo | ..................... B25J 9/104 |
| | | | | 74/490.06 |
| 5,792,135 A | * | 8/1998 | Madhani | ................ A61B 34/77 |
| | | | | 606/1 |
| 8,052,185 B2 | * | 11/2011 | Madhani | .............. B25J 15/0009 |
| | | | | 294/111 |
| 2020/0276720 A1 | * | 9/2020 | Cui | ...................... B25J 17/0258 |

FOREIGN PATENT DOCUMENTS

| JP | 2003211383 | | 7/2003 | |
| KR | 20210103781 A | * | 2/2020 | .......... B25J 17/0258 |

* cited by examiner

*Primary Examiner* — Jake Cook
(74) *Attorney, Agent, or Firm* — JCIPRNET

(57) ABSTRACT

A power transmission device is provided including: a base, provided with a pair of left and right drive pulleys; an intermediate member, rotatably supported by the base about a first axis; and a driven member, rotatably supported by the intermediate member about a second axis. A pair of left wires wound in opposite directions are fixed to the left drive pulley and the driven member. A pair of right wires wound in opposite directions to each other are fixed to the right drive pulley and the driven member. By the drive pulleys, when the driven member is rotated in the same direction about the second axis, torque in opposite directions about the first axis is applied to the driven member, and when the driven member is rotated in opposite directions about the second axis, torque in the same direction about the first axis is applied to the driven member.

16 Claims, 13 Drawing Sheets

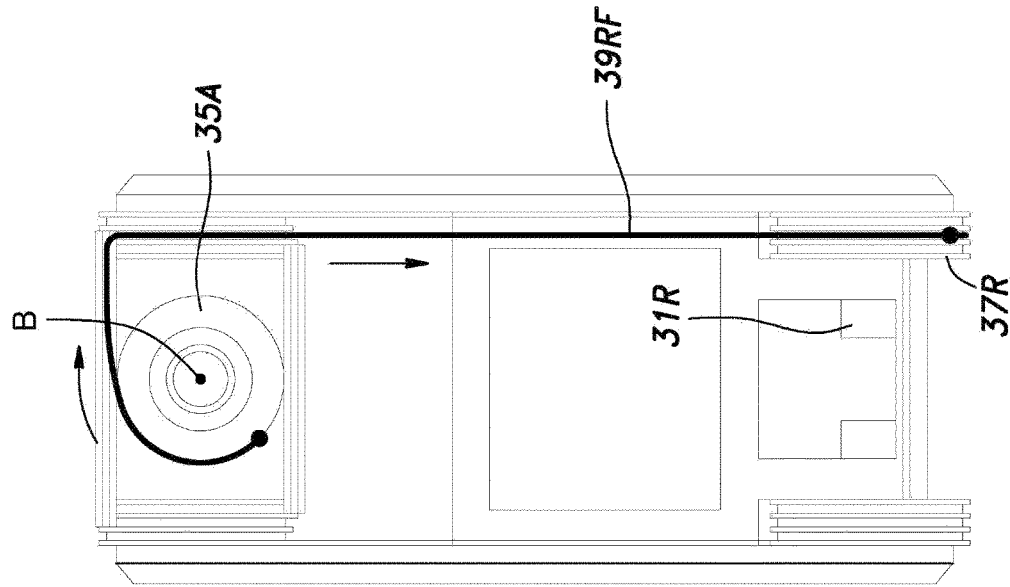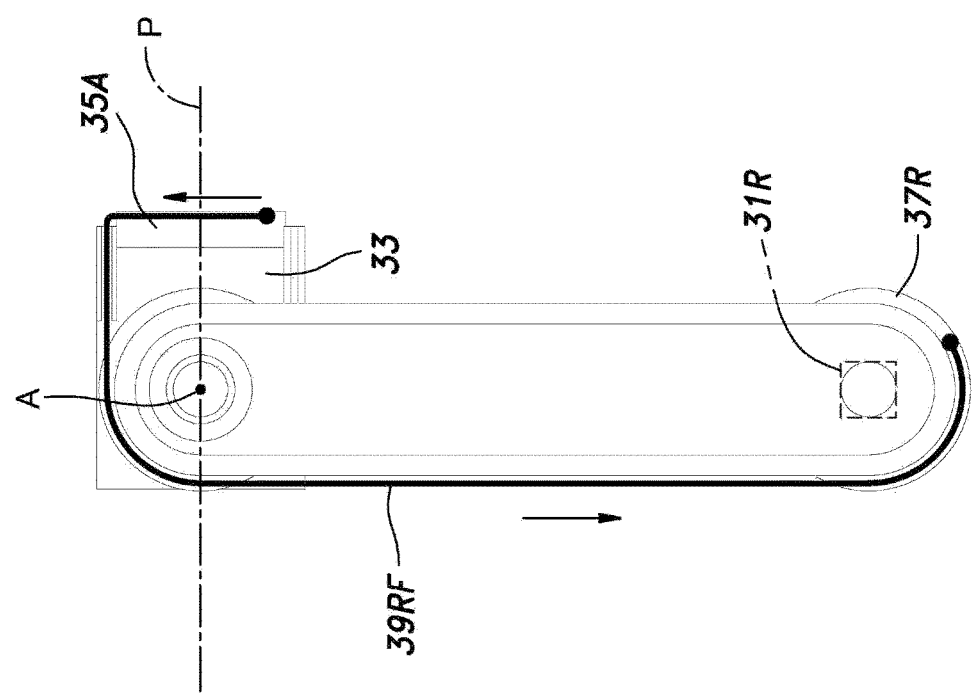
FIG. 10

| Name of drive pulley that rotates | Rotation direction of drive pulley | Wire to be pulled | Direction of torque about first axis applied to driven pulley | Direction of torque about second axis applied to driven pulley |
|---|---|---|---|---|
| Left drive pulley | + | Left front wire | + | + |
| Left drive pulley | − | Left rear wire | − | − |
| Right drive pulley | + | Right front wire | + | − |
| Right drive pulley | − | Right rear wire | − | + |

FIG. 12

| Rotation direction of left drive pulley | Rotation direction of right drive pulley | Rotation direction of driven pulley |
|---|---|---|
| + | + | About first axis +rotation |
| + | − | About second axis +rotation |
| − | − | About first axis -rotation |
| − | + | About second axis -rotation |

FIG. 13

POWER TRANSMISSION DEVICE

CROSS-REFERENCE TO RELATED APPLICATIONS

This application claims the priority benefit of Japan Application No. 2022-033433, filed on Mar. 4, 2022. The entirety of the above-mentioned patent application is hereby incorporated by reference herein and made a part of this specification.

BACKGROUND

Technical Field

The present disclosure relates to a power transmission device based on a wire drive system including a wire and a pulley.

Related Art

A manipulator is known in which a plurality of joints composed of a wire and pulley system are connected (for example, see Patent Document 1). Patent Document 1 discloses, as a conventional example, a manipulator in which each joint is composed of a rotating shaft and two freely rotatable pulleys (a tightening pulley and a loosening pulley) provided on the rotating shaft. The rotating shafts are parallel to each other.

Each of the tightening pulleys has one turn of a tightening wire wound thereon, and a tip of the tightening wire is fixed at a tip position of a finger. By winding the tightening wire by a drive device, each joint rotates and the manipulator bends.

Each of the loosening pulleys is connected from the tip of the finger to a spring by a loosening wire wound in an opposite direction to the tightening wire. The loosening wire and the spring are used in restoring the bent manipulator to its original state.

[Patent Document 1] Japanese Patent Laid-open No. 2003-211383

In a humanoid robot or the like, it is sometimes desired to configure a joint rotatable about two axes, like a joint provided in a human wrist. In the manipulator described in Patent Document 1, the rotating shafts are parallel to each other. Thus, there is a problem that a bending direction is limited to one direction orthogonal to the rotating shafts, and a joint rotatable about two axes cannot be provided in the manipulator.

SUMMARY

According to one aspect, a power transmission device includes: a base, provided with a pair of left and right drive pulleys that are independently rotatable; an intermediate member, rotatably supported by the base about a first axis; and a driven member, rotatably supported by the intermediate member about a second axis orthogonal to the first axis. A pair of left wires wound in opposite directions to each other are each fixed to the left drive pulley and the driven member. A pair of right wires wound in opposite directions to each other are each fixed to the right drive pulley and the driven member. The left wires and the right wires are wound around the intermediate member in order to apply torque that rotates the driven member about the first axis by rotation of the drive pulleys corresponding thereto. When torque about the second axis applied to the driven member via the left wires by rotation of the left drive pulley and torque about the second axis applied to the driven member via the right wires by rotation of the right drive pulley are in the same direction, torque about the first axis applied to the driven member from the left wires and torque about the first axis applied to the driven member from the right wires are in opposite directions. When torque about the second axis applied to the driven member via the left wires by rotation of the left drive pulley and torque about the second axis applied to the driven member via the right wires by rotation of the right drive pulley are in opposite directions, torque about the first axis applied to the driven member from the left wires and torque about the first axis applied to the driven member from the right wires are in the same direction.

BRIEF DESCRIPTION OF THE DRAWINGS

FIG. 10 includes a side view (A) and a front view (B) of a power transmission device for describing a direction of torque applied to an intermediate member and a driven pulley when a right front wire is pulled.

FIG. 12 is a table summarizing directions of torque applied to an intermediate member and a driven pulley from a left wire pair and a right wire pair, respectively.

FIG. 13 is a table summarizing rotation directions of left and right drive pulleys and modes of rotational driving of an intermediate member and a driven member.

DESCRIPTION OF THE EMBODIMENTS

Figure 1:
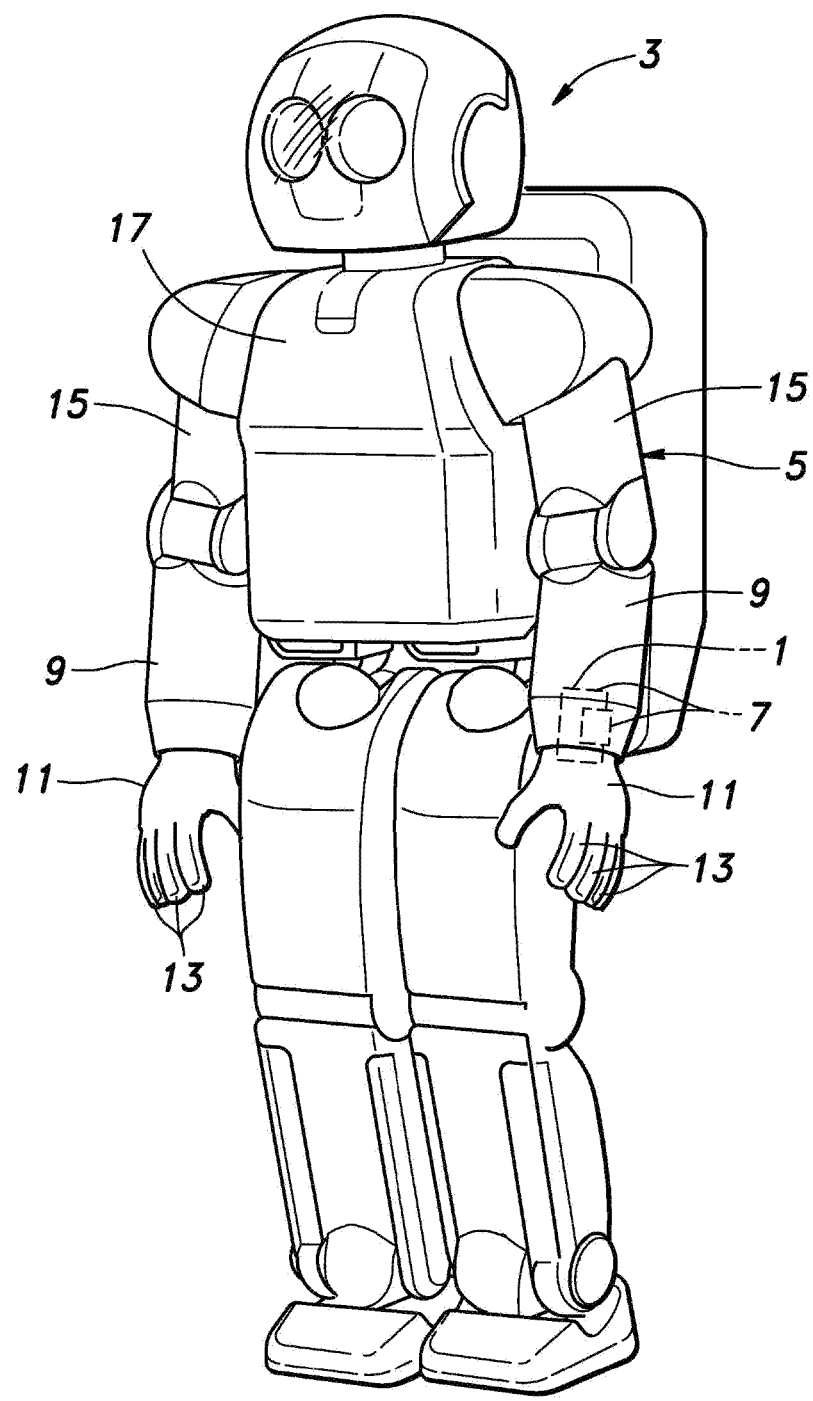
FIG. 1 is a schematic view of a robot provided with a power transmission device according to the disclosure.

The disclosure provides a power transmission device of a wire drive system enabling a driven member connected to a base so as to be rotatable in two directions to be rotated in each direction.

An aspect of the disclosure includes: a base (9), provided with a pair of left and right drive pulleys (37) that are independently rotatable; an intermediate member (33), rotatably supported by the base about a first axis (A); and a driven member (35), rotatably supported by the intermediate member about a second axis (B) orthogonal to the first axis. A pair of left wires (39L) wound in opposite directions to each other are each fixed to the left drive pulley and the driven member. A pair of right wires (39R) wound in opposite directions to each other are each fixed to the right drive pulley and the driven member. The left wires and the right wires are wound around the intermediate member in order to apply torque that rotates the driven member about the first axis by rotation of the drive pulleys corresponding thereto. When torque about the second axis applied to the driven member via the left wires by rotation of the left drive pulley and torque about the second axis applied to the driven member via the right wires by rotation of the right drive pulley are in the same direction, torque about the first axis applied to the driven member from the left wires and torque about the first axis applied to the driven member from the right wires are in opposite directions. When torque about the second axis applied to the driven member via the left wires by rotation of the left drive pulley and torque about the second axis applied to the driven member via the right wires by rotation of the right drive pulley are in opposite directions, torque about the first axis applied to the driven member from the left wires and torque about the first axis applied to the driven member from the right wires are in the same direction.

According to this aspect, when the left and right drive pulleys are respectively driven in order to rotate the driven member in the same direction about the second axis, the left wires and the right wires respectively apply torque in opposite directions about the first axis to the driven member. Accordingly, the torque about the first axis in the driven member is canceled out and the driven member rotates about the second axis.

On the other hand, when the left and right drive pulleys are respectively driven in order to rotate the driven member in opposite directions about the second axis, the left wires and the right wires respectively apply torque in the same direction about the first axis to the driven member. Accordingly, the torque about the second axis in the driven member is canceled out and the driven member rotates about the first axis. In this way, depending on a driving direction of the two drive pulleys, the driven member can be rotated about either the first axis or the second axis.

In the above aspect, preferably, the torque about the first axis applied to the driven member when tension is applied to one of the left wires is in a direction opposite to the torque about the first axis applied to the driven member when tension is applied to the other of the left wires, and the torque about the first axis applied to the driven member when tension is applied to one of the right wires is in a direction opposite to the torque about the first axis applied to the driven member when tension is applied to the other of the right wires.

According to this aspect, depending on the driving direction of the drive pulleys, a direction of the torque about the first axis applied to the driven member by the left wires and the right wires can be changed.

In the above aspect, preferably, the intermediate member includes a pair of left idler pulleys (49VL) around which the left wires are respectively wound and a pair of right idler pulleys (49VR) around which the right wires are respectively wound.

According to this aspect, the direction of the left wires and the right wires can be well guided.

In the above aspect, preferably, the intermediate member has a pair of horizontal side surfaces (41HS) orthogonal to the first axis and facing away from each other, and a pair of vertical side surfaces (41VS) orthogonal to the horizontal side surfaces and facing away from each other. On the vertical side surfaces, the pair of left idler pulleys and the pair of right idler pulleys are arranged symmetrically about an imaginary plane (P) orthogonal to the vertical side surfaces and containing the first axis, each being supported on the vertical side surfaces so as to be rotatable about an axis parallel to the vertical side surfaces.

According to this aspect, the direction of the left wires and the right wires can be well guided.

In the above aspect, preferably, a pair of horizontal idler pulleys (49H) are provided coaxial with the first axis and rotatable about the first axis. The left wires and the right wires are respectively wound around the horizontal idler pulleys corresponding thereto between the drive pulleys and the driven member.

According to this aspect, the direction of the left wires and the right wires can be well guided.

In the above aspect, preferably, a pair of horizontal idler pulleys (49H) are provided coaxial with the first axis and rotatable about the first axis. The left wires and the right wires are respectively wound around the horizontal idler pulleys corresponding thereto between the drive pulleys and the driven member. The pair of left idler pulleys and the pair of right idler pulleys are all of the same shape. One of the horizontal idler pulleys is of the same shape as the other of the horizontal idler pulleys.

According to this aspect, a driving operation of the drive pulleys is simplified.

In the above aspect, preferably, the intermediate member is provided with a through hole (43).

According to this aspect, a wire for driving a wire can be passed through the through hole.

In the above aspect, preferably, the driven member is provided with an assisted drive part (13) driven by a linear member (19), and the linear member passes through the through hole.

According to this aspect, since the linear member is arranged to pass through the through hole, the linear member is less likely to protrude from the power transmission device, and driving of the driven member is less likely to be hindered by the linear member.

In the above aspect, preferably, a recess or an accommodation hole (25) accommodating an auxiliary drive device (27) driving the assisted driven part is formed in the base.

According to this aspect, by accommodating the assisted drive part in the recess or the accommodation hole, a machine or a robot provided with the power transmission device can be made compact.

In this way, according to the disclosure, it is possible to provide a power transmission device of a wire drive system enabling a driven member connected to a base so as to be rotatable in two directions to be rotated in each direction.

Hereinafter, an embodiment of the disclosure is described in detail with reference to the drawings.

A power transmission device 1 is provided in a robot hand 5 of a humanoid robot 3 and constitutes a portion of a drive device 7 for driving the robot hand 5. As shown in FIG. 1, the robot hand 5 constitutes a portion of the humanoid robot 3 corresponding to a portion from an upper arm to a fingertip of a human. The robot hand 5 is driven in much the same way as a human, and is able to grasp an object by, for example, moving a finger.

Figure 2:
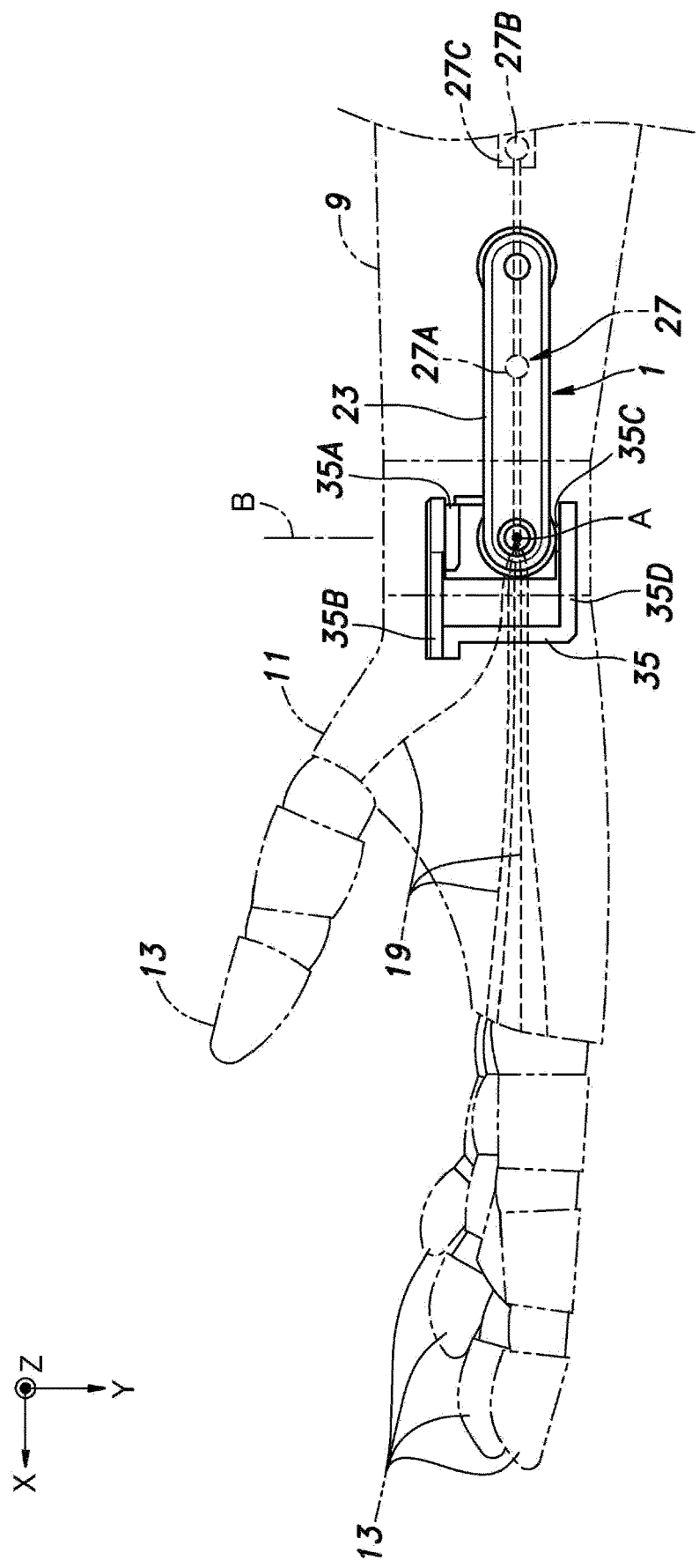
FIG. 2 is a diagram for describing a position where a power transmission device is provided.

First, the robot hand 5 provided with the power transmission device 1 is described. As shown in FIG. 2, the robot hand 5 includes a lower arm 9, a palm 11 and a plurality of fingers 13.

The lower arm 9 is of a shape corresponding to a lower arm of a human. The lower arm 9 extends in a predetermined direction. A base end side of the lower arm 9 is connected to a body 17 via an upper arm 15. The palm 11 is connected to a tip side of the lower arm 9. Hereinafter, an extension direction of the lower arm 9 is defined as an X-axis direction, a body side is referred to as negative side in the X-axis direction, and a fingertip side is referred to as positive side in the X-axis direction.

The palm 11 is of a shape corresponding to a human palm. The palm 11 is connected to an extension end of the lower arm 9. A joint connecting the palm 11 with the lower arm 9 corresponds to a joint (radiocarpal joint) of a human wrist. Since the joint of the human wrist is a biaxial joint, the joint connecting the palm 11 with the lower arm 9 is configured to be rotatable about two axes.

Specifically, as shown in FIG. 2, the palm 11 rotates from an extension position extending from the lower arm 9 in a direction along the X-axis to a bending position where the joint connecting the palm 11 with the lower arm 9 bends. In the following, a direction in which the palm 11 bends is defined as an Y-axis (see FIG. 1), and a direction of a rotation axis of the palm 11 is referred to as an Z-axis direction. The palm 11 is connected to the lower arm 9 so as to be rotatable in any of the Y-axis and Z-axis directions.

The finger 13 is connected to the palm 11. Each finger 13 includes a plurality of links rotatably connected to each other via a joint, and a wire for rotating the links. By selectively applying a pulling force to the wire, the finger 13 is able to be displaced at the joint between a bent state in which it is bent and an extended state in which it is extended. Hereinafter, a wire for extending and bending the finger 13 is referred to as finger drive wire 19.

Figure 3:
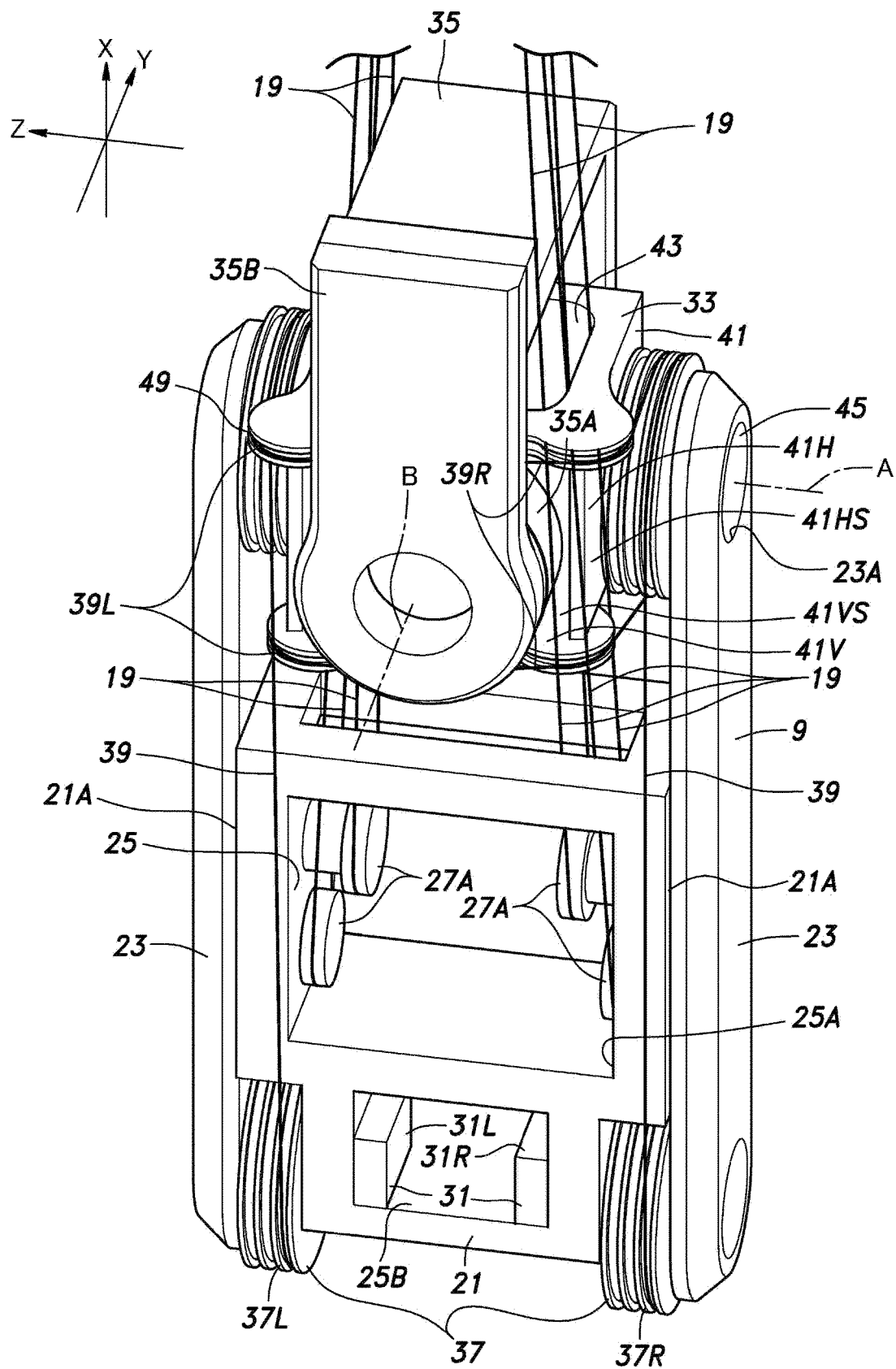
FIG. 3 is a perspective view of a power transmission device.

As shown in FIG. 3, the lower arm 9 includes a lower arm body 21 extending in the X-axis direction and a pair of side plates 23 provided on the lower arm body 21. In the present embodiment, the lower arm body 21 is in the shape of a frame extending in the X-axis direction and having two accommodation holes 25 penetrating in the Y-axis direction. In the present embodiment, the lower arm body 21 has a flat fastening surface 21A provided at both outer edges in the Z-axis direction. The two side plates 23 are arranged side by side in the Z-axis direction so as to face each other with an interval therebetween. The two side plates 23 are fastened to the fastening surface 21A of the lower arm body 21 at their respective opposing surfaces. A width in the Z-axis direction of an end of the lower arm body 21 on the negative side in the X-axis direction is smaller than the interval between the two side plates 23. Between an end of the two side plates 23 on the negative side in the X-axis direction and the end of the lower arm body 21 on the negative side in the X-axis direction, two gaps are provided side by side in the Z-axis direction.

In one accommodation hole 25 (hereinafter referred to as first accommodation hole 25A, and the other accommodation hole 25 is referred to as second accommodation hole 25B) of the lower arm 9, at least a portion of a finger drive device 27 for driving the finger 13 is accommodated. The finger drive device 27 includes a finger driven pulley 27A around which the finger drive wire 19 is wound, a finger drive pulley 27B to which the finger drive wire 19 is fixed, and a finger actuator 27C that drives the finger drive pulley 27B. In the present embodiment, the finger actuator 27C is composed of a motor that rotates the finger drive pulley 27B. The finger driven pulley 27A of the finger drive device 27 is accommodated in the first accommodation hole 25A. By pulling or loosening the finger drive wire 19 by the finger actuator 27C, each finger 13 is displaced into the extended state or the bent state. In the present embodiment, each finger driven pulley 27A has a groove (not shown) on an outer peripheral surface, and is rotatably supported by the lower arm 9 so that each groove faces a connection portion between the palm 11 and the lower arm 9.

The drive device 7 rotationally drives the palm 11 with respect to the lower arm 9 about two axes orthogonal to the extension direction of the lower arm 9. The drive device 7 further includes a pair of actuators 31 in addition to the power transmission device 1. The power transmission device 1 serves to transmit power of the actuator 31 to the palm 11 and rotate the palm 11 about the two axes (Y-axis and Z-axis) orthogonal to the lower arm 9.

The actuator 31 is provided in the lower arm 9, the upper arm 15, and the body 17. Each actuator 31 is composed of a motor. In the present embodiment, the actuator 31 is accommodated and fixed in the second accommodation hole 25B provided in the lower arm body 21. A rotating shaft of the actuator 31 passes through a through hole (not shown) of the lower arm body 21, and extends into the gaps between the end of the lower arm body 21 on the negative side in the X-axis direction and the end of the side plates 23 on the negative side in the X-axis direction.

The power transmission device 1 includes the lower arm 9 (base), an intermediate member 33 connected to the lower arm 9, a driven member 35 connected to the intermediate member 33 and connected to the palm 11, a pair of drive pulleys 37 and two pairs of wires 39.

Each drive pulley 37 is of the same shape. The drive pulleys 37 are respectively accommodated in the gaps between the end of the two side plates 23 on the negative side in the X-axis direction and the end of the lower arm 9 on the negative side in the X-axis direction. The drive pulleys 37 are respectively arranged side by side in the Z-axis direction. The drive pulleys 37 are respectively arranged coaxially with an axis of the rotating shaft of the actuator 31 and fixed to the rotating shaft of the actuator 31. The drive pulleys 37 are each independently rotatable in both directions with respect to the lower arm 9 by driving the actuator 31 connected thereto. Hereinafter, the drive pulley 37 located on the positive side in the Z-axis direction is referred to as left drive pulley 37L, and the drive pulley 37 located on the negative side in the Z-axis direction is referred to as right drive pulley 37R. The actuator 31 that rotationally drives the left drive pulley 37L is referred to as left actuator 31L, and the actuator 31 that rotationally drives the right drive pulley 37R is referred to as right actuator 31R.

In the present embodiment, the intermediate member 33 is in the shape of a square frame having two pairs of sidewalls 41 facing each other and provided with a through hole 43. The through hole 43 has the finger drive wire 19 inserted therethrough.

The intermediate member 33 is arranged between the two side plates 23. Among the sidewalls 41 constituting the intermediate member 33, a pair of sidewalls 41 are arranged so as to respectively face the side plates 23 (that is, be oriented in the Z-axis direction). Hereinafter, the pair of sidewalls 41 facing the side plates 23 are referred to as horizontal sidewalls 41H, and the other pair of sidewalls 41 are referred to as vertical sidewalls 41V.

The horizontal sidewalls 41H are provided with, in the Z-axis direction, shafts 45 of a columnar shape protruding in directions away from each other. Each side plate 23 is provided with a through hole 23A penetrating along one axis (hereinafter referred to as first axis A) extending in the Z-axis direction, and each shaft 45 is rotatably received in the through hole 23A via a known bearing. Accordingly, the intermediate member 33 is rotatably supported by the side plate 23 (that is, the lower arm 9) about the first axis A.

Outer surfaces of the horizontal sidewalls 41H in the Z-direction constitute a pair of horizontal side surfaces 41HS orthogonal to the first axis A and facing away from each other. Surfaces of the vertical sidewalls 41V in directions away from each other constitute a pair of vertical side surfaces 41VS orthogonal to the first axis A and facing away from each other. That is, the intermediate member 33 has, as surfaces constituting an outer peripheral surface, the pair of horizontal side surfaces 41HS orthogonal to the first axis A and facing away from each other, and the pair of vertical side surfaces 41VS orthogonal to the horizontal side surfaces 41HS and facing away from each other.

The driven member 35 includes a driven pulley 35A provided on one vertical sidewall 41V (hereinafter referred to as rear vertical wall) of the intermediate member 33 and a plate-like part 35B connecting the driven pulley 35A with the palm 11. The driven pulley 35A is rotatably supported by one vertical sidewall 41V on a base end side. In the present embodiment, the driven pulley 35A is rotatably coupled to an outer surface (hereinafter referred to as rear vertical side surface 41VS) of the rear vertical wall about an axis (second axis B) perpendicular to the outer surface. The second axis B is orthogonal to (intersects at a right angle) the first axis A. The plate-like part 35B is fixed to a tip surface of the driven pulley 35A, and a palm body is fixed to the plate-like part 35B.

In the present embodiment, as shown in FIG. 2, the driven member 35 includes, in addition to the driven pulley 35A and the plate-like part 35B, an auxiliary driven part 35C and a connection part 35D. The auxiliary driven part 35C is rotatably supported by the other vertical sidewall 41V of the intermediate member 33 about the second axis B. The connection part 35D is connected to a tip of the auxiliary driven part 35C on a base end side, extends in the X-axis direction, then bends to the negative side in the Y-axis direction, and is connected to the plate-like part 35B at a tip. The plate-like part 35B, the auxiliary driven part 35C and the connection part 35D are integral with the driven pulley 35A and rotate about the second axis B in response to rotation of the driven pulley 35A.

Among the two pairs of wires 39, one wire pair (hereinafter referred to as left wire pair 39L, and also as left wires) connects the left drive pulley 37L and the driven pulley 35A and transmits power of the left drive pulley 37L to the driven pulley 35A. Among the two pairs of wires 39, the other wire pair (hereinafter referred to as right wire pair 39R, and also as right wires) connects the right drive pulley 37R and the driven pulley 35A and transmits power of the right drive pulley 37R to the driven pulley 35A.

In a connection path of each wire 39, a plurality of idler pulleys 49 (hereinafter referred to as idler pulley group 49G) are provided for changing a power transmission direction and rotating the intermediate member 33. Herein, the idler pulley group 49G will be first described, followed by a detailed description of the connection path of the wire 39.

Figure 4:
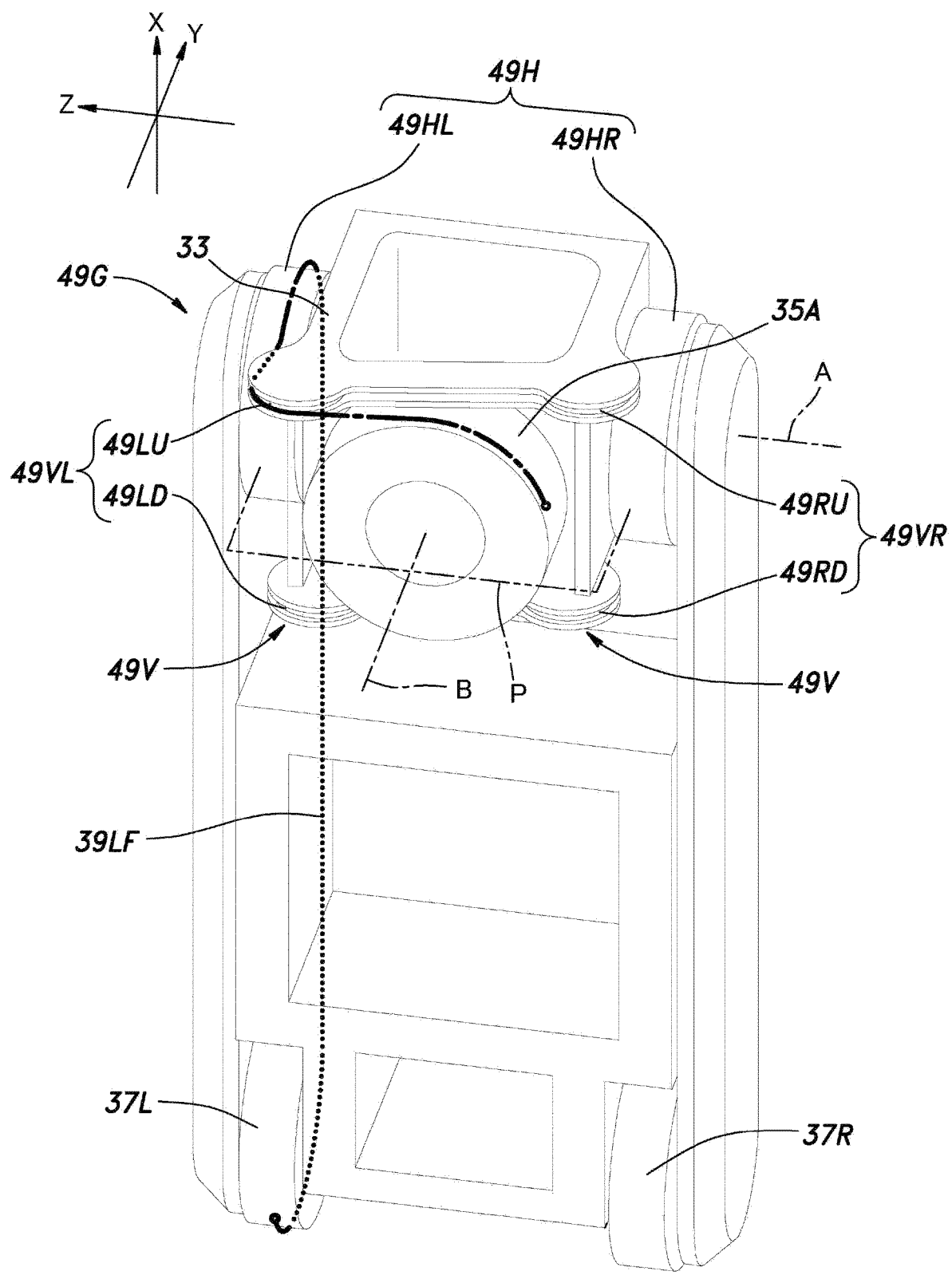
FIG. 4 is a schematic view for describing a mode of winding of a left front wire.

As shown in FIG. 4, the idler pulley group 49G includes a pair of horizontal idler pulleys 49H provided between the side plate 23 and the intermediate member 33, and four vertical idler pulleys 49V provided on the intermediate member 33.

The pair of horizontal idler pulleys 49H are of the same shape as each other. The horizontal idler pulleys 49H are arranged with an interval therebetween in the Z-axis direction between the horizontal sidewall 41H and the side plate 23. Each horizontal idler pulley 49H is connected to the shaft 45 via a bearing. Accordingly, each horizontal idler pulley 49H is arranged coaxially with the first axis A and rotatably supported on the horizontal side surface 41HS about the first axis A. Accordingly, the horizontal idler pulley 49H is independently rotatable of the intermediate member 33. Hereinafter, the horizontal idler pulley 49H located on the positive side in the Z-axis direction is referred to as left horizontal idler pulley 49HL, and the horizontal idler pulley 49H located on the negative side in the Z-axis direction is referred to as right horizontal idler pulley 49HR.

All the vertical idler pulleys 49V are of the same shape. The vertical idler pulley 49V is provided at each of four corners of the rear vertical wall.

The two vertical idler pulleys 49V (hereinafter referred to as left vertical idler pulleys 49VL, and also as left idler pulleys) located on the positive side in the Z-axis direction are arranged in a pair symmetrically about an imaginary plane P orthogonal to the rear vertical side surface 41VS and containing the first axis A. Each of the pair of left vertical idler pulleys 49VL is rotatably supported by the intermediate member 33 about an axis parallel to the rear vertical side surface 41VS. In an outer peripheral surface of the left vertical idler pulley 49VL, a groove is provided extending in a circumferential direction and recessed in an axis direction. Each groove is recessed in a direction perpendicular to the rear vertical side surface 41VS.

Hereinafter, when the intermediate member 33 is arranged so that the second axis B extends in the Y-axis direction and the rear vertical side surface 41VS faces the negative side in the Y-axis direction, among the left vertical idler pulleys 49VL, the left vertical idler pulley 49VL located on the positive side in the X-axis direction is referred to as upper left vertical idler pulley 49LU, and the left vertical idler pulley 49VL located on the negative side in the X-axis direction is referred to as lower left vertical idler pulley 49LD.

The two vertical idler pulleys 49V (hereinafter referred to as right vertical idler pulleys 49VR, and also as right idler pulleys) located on the negative side in the Z-axis direction are arranged in a pair symmetrically about the imaginary plane P (see also (A) of FIG. 8) orthogonal to the rear vertical side surface 41VS and containing the first axis A. Each of the pair of right vertical idler pulleys 49VR is rotatably supported by the intermediate member 33 about an axis parallel to the rear vertical side surface 41VS. In an outer peripheral surface of the right vertical idler pulley 49VR, a groove is provided extending in the circumferential direction and recessed in the axis direction. Each groove is recessed in a direction perpendicular to the rear vertical side surface 41VS.

Hereinafter, when the intermediate member 33 is arranged so that the second axis B extends in the Y-axis direction and the rear vertical side surface 41VS faces the negative side in the Y-axis direction, among the right vertical idler pulleys 49VR, the right vertical idler pulley 49VR located on the positive side in the X-axis direction is referred to as upper right vertical idler pulley 49RU, and the right vertical idler pulley 49VR located on the negative side in the X-axis direction is referred to as lower right vertical idler pulley 49RD.

Next, the left wire pair 39L is described.

Figure 5:
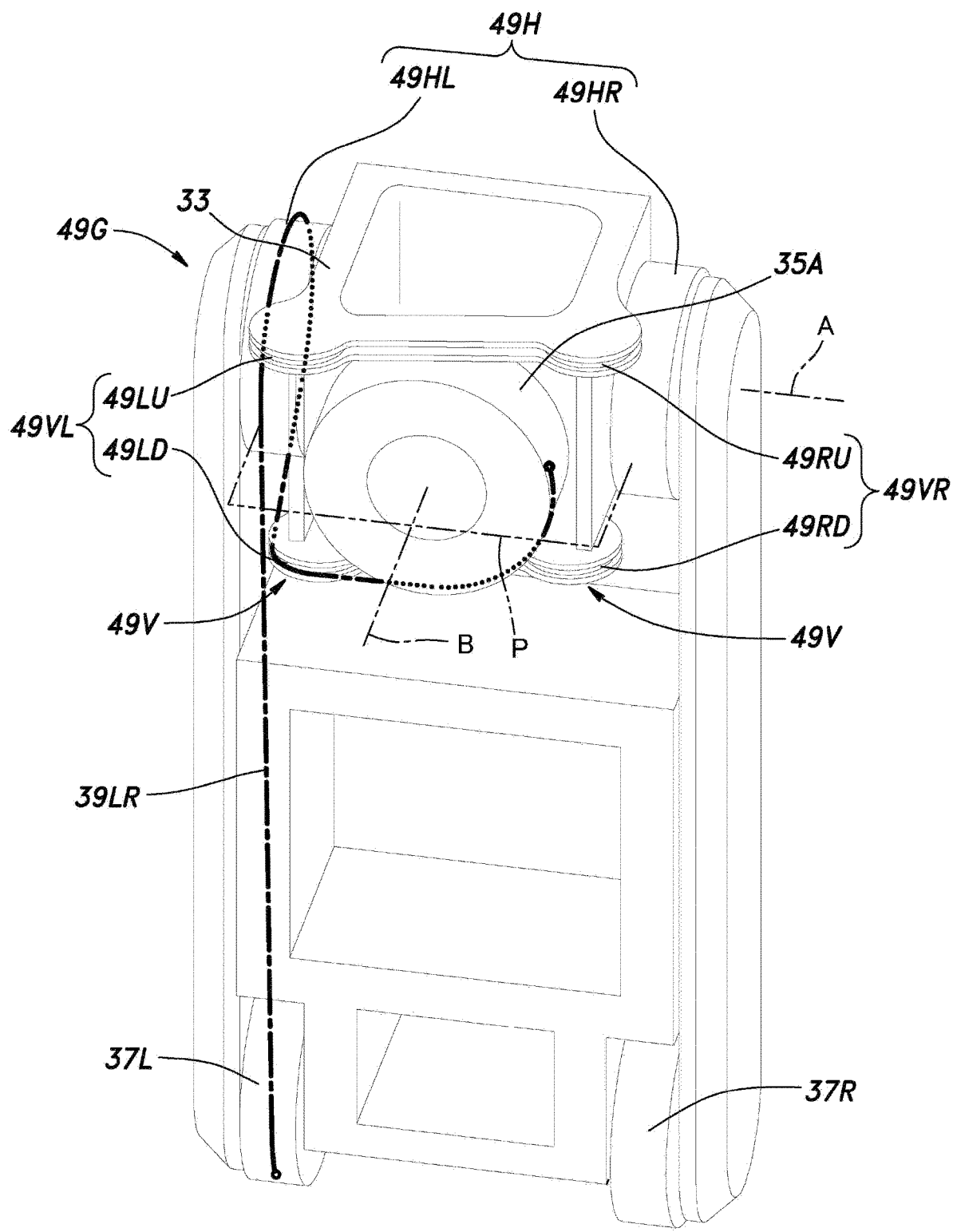
FIG. 5 is a schematic view for describing a mode of winding of a left rear wire.

The left wire pair 39L connects the left drive pulley 37L and the driven pulley 35A. As shown in FIG. 4 and FIG. 5, one (hereinafter referred to as left front wire 39LF) of the left wire pair 39L and the other (hereinafter referred to as left rear wire 39LR) of the left wire pair 39L are wound around and fixed to the left drive pulley 37L at one end. The left front wire 39LF and the left rear wire 39LR are respectively wound around the left drive pulley 37L in opposite directions. As shown in FIG. 4 (see also (A) of FIG. 8), the left front wire 39LF is fixed to the left drive pulley 37L at one end, and is wound rightward (clockwise) around the left drive pulley 37L as viewed from the positive side in the Z-axis direction. As shown in FIG. 5 (see also (A) of FIG. 9), the left rear wire 39LR is fixed to the left drive pulley 37L at one end, and is wound leftward (counterclockwise) around the left drive pulley 37L as viewed from the positive side in the Z-axis direction.

As shown in FIG. 4, the left front wire 39LF extends in the positive direction of the X-axis, is wound rightward (clockwise) around the left horizontal idler pulley 49HL as viewed from the positive side in the Z-axis direction, is wound around each of the upper left vertical idler pulley 49LU and the driven pulley 35A, and is fixed to the driven pulley 35A.

As shown in FIG. 5, the left rear wire 39LR extends in the positive direction of the X-axis, is wound leftward (counterclockwise) around the left horizontal idler pulley 49HL as viewed from the positive side in the Z-axis direction, is wound around each of the lower left vertical idler pulley 49LD and the driven pulley 35A, and is fixed to the driven pulley 35A. The left wire pair 39L (left front wire 39LF and left rear wire 39LR) are each wound around the left horizontal idler pulley 49HL between the drive pulley 37 and the driven pulley 35A.

As shown in FIG. 4 and FIG. 5, the direction in which the left front wire 39LF is wound around the driven pulley 35A is set opposite to the direction in which the left rear wire 39LR is wound around the driven pulley 35A. In detail, as viewed from the negative side in the Y-axis direction, the left front wire 39LF is wound rightward (clockwise) around the driven pulley 35A (see also (B) of FIG. 8), and the left rear wire 39LR is wound leftward (counterclockwise) around the driven pulley 35A (see also (B) of FIG. 9).

Next, the right wire pair 39R is described.

Figure 6:
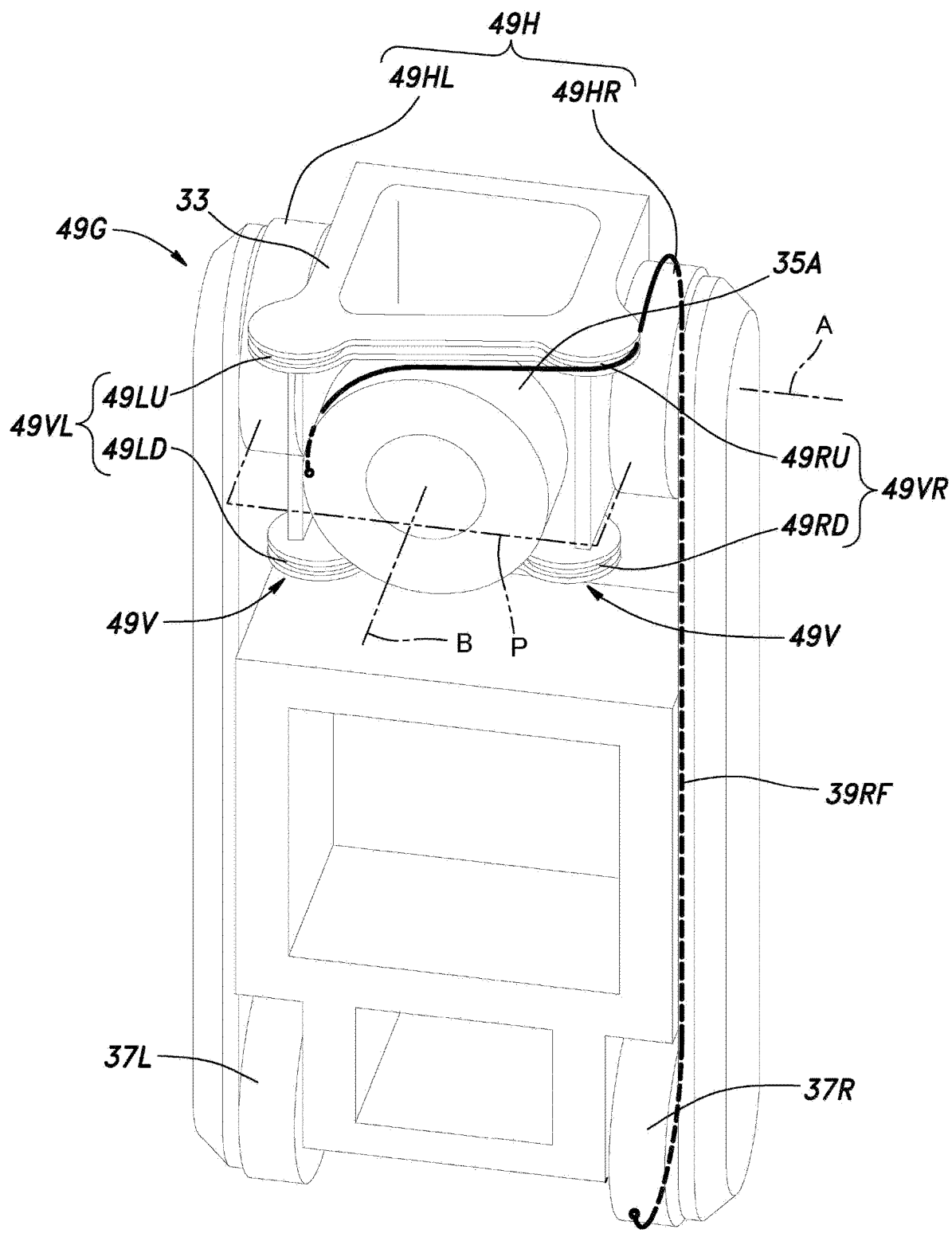
FIG. 6 is a schematic view for describing a mode of winding of a right front wire.
Figure 7:
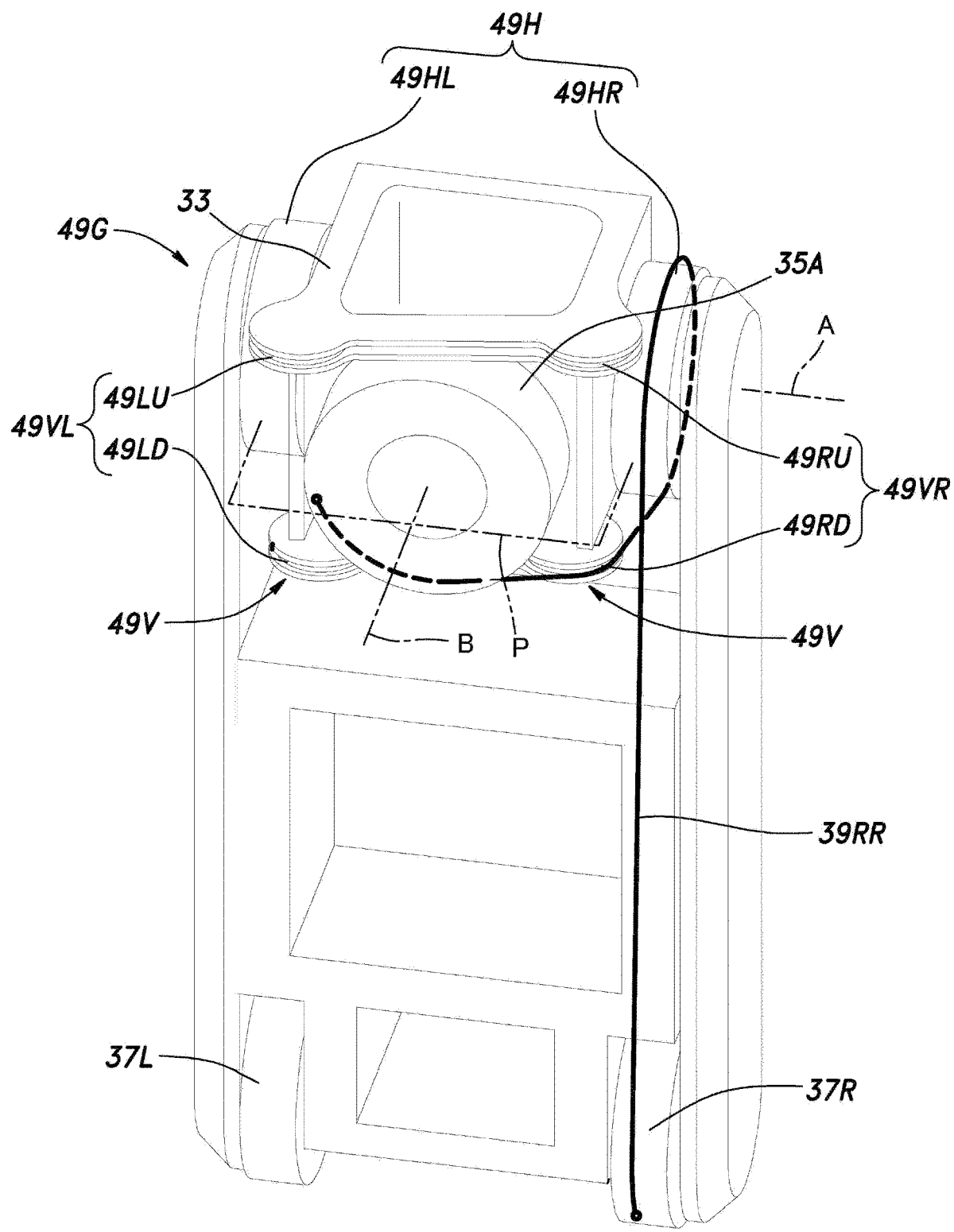
FIG. 7 is a schematic view for describing a mode of winding of a right rear wire.
Figure 11:
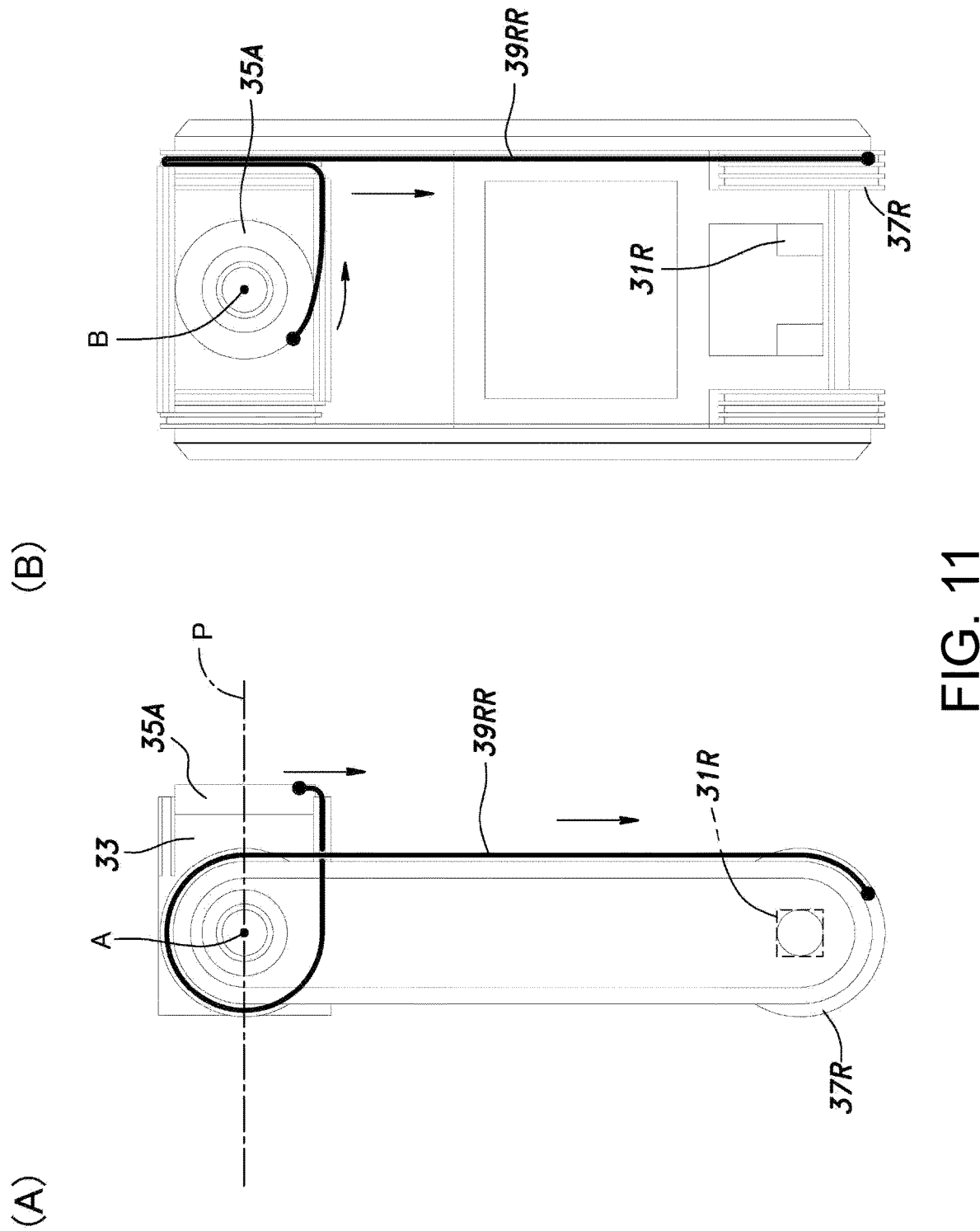
FIG. 11 includes a side view (A) and a front view (B) of a power transmission device for describing a direction of torque applied to an intermediate member and a driven pulley when a right rear wire is pulled.

The right wire pair 39R connects the right drive pulley 37R and the driven pulley 35A. One (hereinafter referred to as right front wire 39RF) of the right wire pair 39R and the other (hereinafter referred to as right rear wire 39RR) of the right wire pair 39R are wound around and fixed to the right drive pulley 37R at one end. The right front wire 39RF and the right rear wire 39RR are respectively wound around the right drive pulley 37R in opposite directions. As shown in FIG. 6 (see also (A) of FIG. 10), the right front wire 39RF is fixed to the right drive pulley 37R at one end, and is wound rightward (clockwise) around the right drive pulley 37R as viewed from the positive side in the Z-axis direction. As shown in FIG. 7 (see also (A) of FIG. 11), the right rear wire 39RR is wound leftward (counterclockwise) around the right drive pulley 37R as viewed from the positive side in the Z-axis direction.

As shown in FIG. 6, the right front wire 39RF extends in the positive direction of the X-axis, is wound rightward (clockwise) around the right horizontal idler pulley 49HR as viewed from the positive side in the Z-axis direction, is wound around each of the upper right vertical idler pulley 49RU and the driven pulley 35A in the order described, and is fixed to the driven pulley 35A.

As shown in FIG. 7, the right rear wire 39RR extends in the positive direction of the X-axis, is wound leftward (counterclockwise) around the right horizontal idler pulley 49HR as viewed from the positive side in the Z-axis direction, is wound around each of the lower right vertical idler pulley 49RD and the driven pulley 35A in the order described, and is fixed to the driven pulley 35A. The right wire pair 39R (right front wire 39RF and right rear wire 39RR) are each wound around the right horizontal idler pulley 49HR between the drive pulley 37 and the driven member 35.

As shown in FIG. 6 and FIG. 7, the direction in which the right front wire 39RF is wound around the driven pulley 35A is set opposite to the direction in which the right rear wire 39RR is wound around the driven pulley 35A. In detail, as viewed from the negative side in the Y-axis direction, the right front wire 39RF is wound leftward (counterclockwise) around the driven pulley 35A (see also (B) of FIG. 10), and the right rear wire 39RR is wound rightward (clockwise) around the driven pulley 35A (see also (B) of FIG. 11).

In this way, by the idler pulley group 49G, the left wire pair 39L and the right wire pair 39R can be well guided in their respective extension directions.

Next, an operation of the power transmission device 1 configured in this manner is described.

When the left actuator 31L rotates the left drive pulley 37L leftward (hereinafter referred to as positive direction) as viewed from the positive side in the Z-axis direction, as shown in (A) and (B) of FIG. 8, the left front wire 39LF is pulled.

Figure 8:
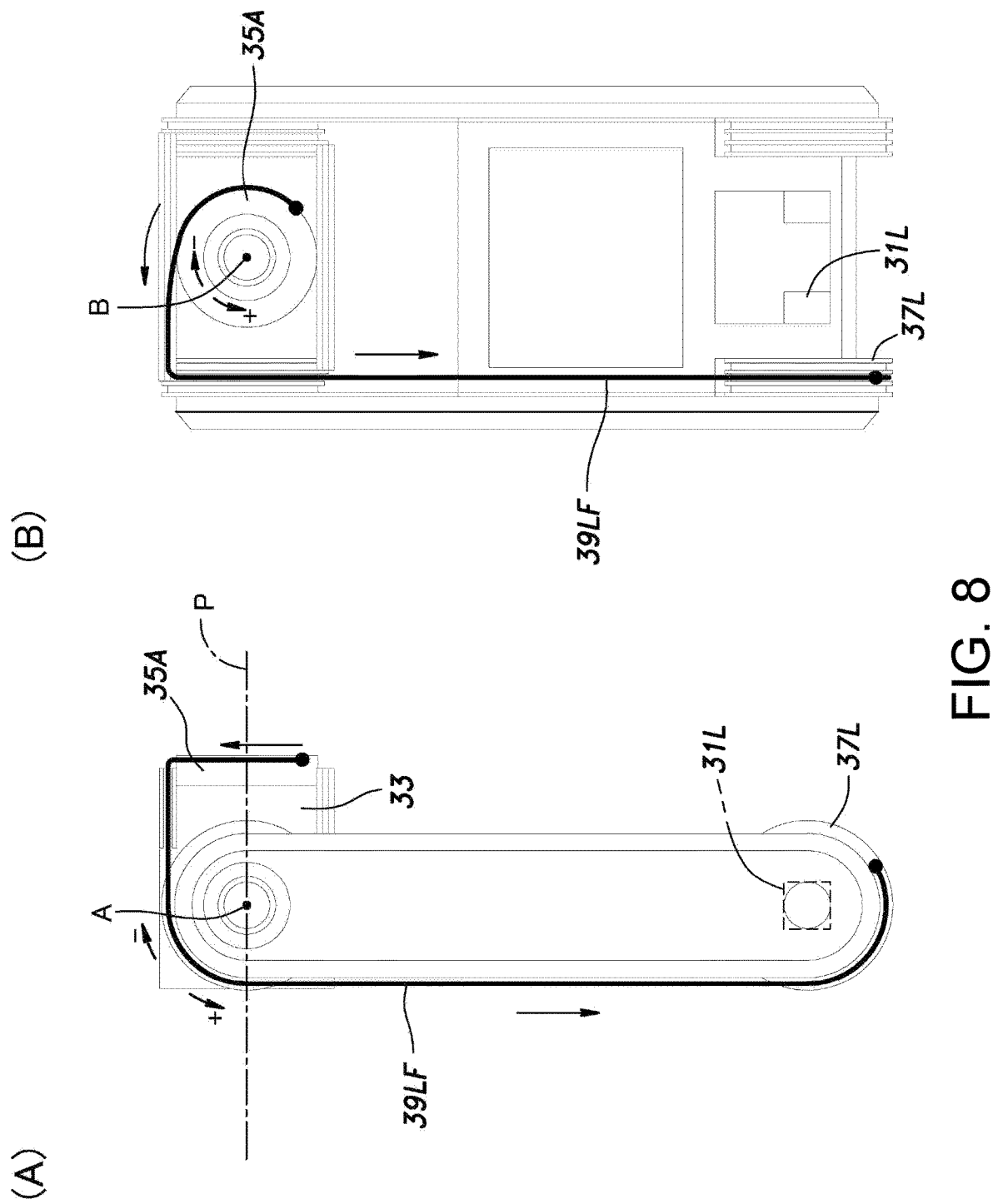
FIG. 8 includes a side view (A) and a front view (B) of a power transmission device for describing a direction of torque applied to an intermediate member and a driven pulley when a left front wire is pulled.

At this time, as shown in (A) of FIG. 8, torque is applied that rotates the driven pulley 35A leftward about the first axis A as viewed from the positive side in the Z-axis direction. Hereinafter, in the torque that rotates the driven pulley 35A about the first axis A, as viewed from the positive side in the Z-axis direction, the leftward rotation is referred to as positive direction, and the rightward rotation is referred to as negative direction (see signs "+" and "−" in (A) of FIG. 8). However, the torque as mentioned herein means moment about a rotation axis of a force acting from each wire 39, and the driven pulley 35A rotates in accordance with the sum of the torque applied from all the wires 39. When the left drive pulley 37L is rotated by driving the left actuator 31L and the left front wire 39LF is pulled, torque that rotates the driven pulley 35A in the positive direction about the first axis A is applied to the driven pulley 35A.

As shown in (B) of FIG. 8, torque that rotates the driven pulley 35A leftward about the second axis B as viewed from the negative side in the Y-axis direction is further applied to the driven pulley 35A. Hereinafter, in the torque that rotates the driven pulley 35A about the second axis B, as viewed from the negative side in the Y-axis direction when the second axis B extends in the Y-axis direction and the rear vertical side surface 41VS faces the negative side in the Y-axis direction (in other words, as viewed along the second axis B in a direction toward the rear vertical side surface 41VS), the leftward rotation is referred to as positive direction, and the rightward rotation is referred to as negative direction (see signs "+" and "−" in (B) of FIG. 8). When the left drive pulley 37L is rotated by driving the left actuator 31L and the left front wire 39LF is pulled, torque that rotates the driven pulley 35A in the positive direction about the second axis B is applied to the driven pulley 35A.

In this way, when the left actuator 31L rotates the left drive pulley 37L in the positive direction, the torque that rotates the driven pulley 35A in the positive direction about the first axis A and the torque that rotates the driven pulley 35A in the positive direction about the second axis B are applied to the driven pulley 35A at the same time.

Figure 9:
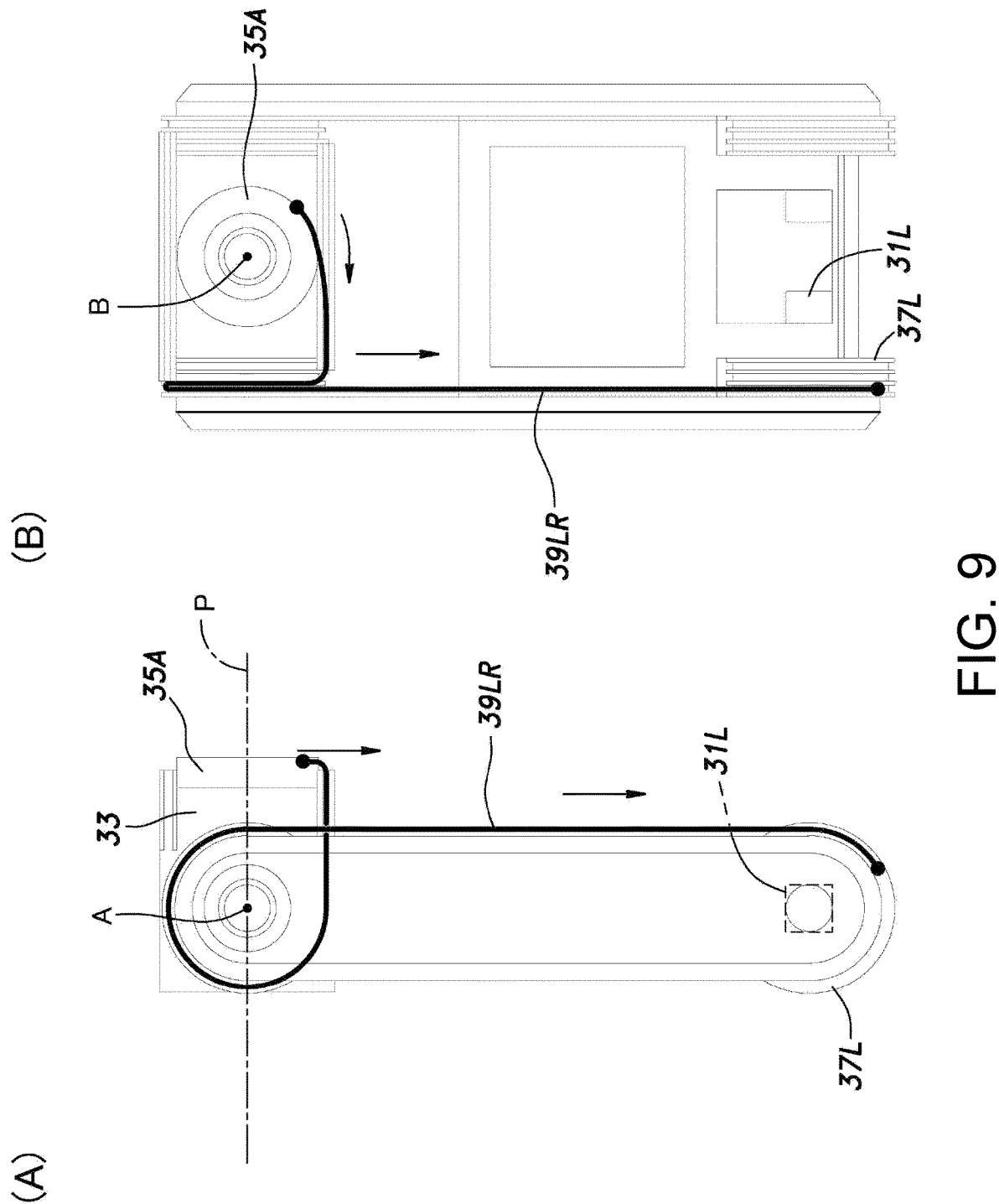
FIG. 9 includes a side view (A) and a front view (B) of a power transmission device for describing a direction of torque applied to an intermediate member and a driven pulley when a left rear wire is pulled.

As shown in (A) of FIG. 9, when the left actuator 31L rotates the left drive pulley 37L rightward (that is, in the negative direction) as viewed from the positive side in the Z-axis direction, the left rear wire 39LR is pulled.

At this time, torque in a direction opposite to the case of the left front wire 39LF, that is, torque that rotates the driven pulley 35A rightward about the first axis A (torque that causes rotation in the negative direction about the first axis A) as viewed from the positive side in the Z-axis direction is applied to the driven pulley 35A.

As shown in (B) of FIG. 9, torque that rotates the driven pulley 35A rightward about the second axis B as viewed from the negative side in the Y-axis direction, that is, torque that causes rotation in the negative direction, is applied to the driven pulley 35A.

In this way, when the left actuator 31L rotates the left drive pulley 37L in the negative direction, the left rear wire 39LR is pulled, and the torque that causes rotation in the negative direction about the first axis A and the torque that causes rotation in the negative direction about the second axis B are applied to the driven pulley 35A at the same time.

In this way, the torque about the first axis A applied to the driven pulley 35A when tension is applied to one of the left wire pair 39L is in a direction opposite to that of the torque about the first axis A applied to the driven pulley 35A when tension is applied to the other of the left wire pair 39L.

Similarly, when the right actuator 31R rotates the right drive pulley 37R leftward (hereinafter referred to as positive direction) as viewed from the positive side in the Z-axis direction, the right front wire 39RF is pulled. Accordingly, as shown in (A) of FIG. 10, torque that causes rotation in the positive direction about the first axis A is applied to the driven pulley 35A. As shown in (B) of FIG. 10, since the right front wire 39RF is wound leftward around the driven pulley 35A as viewed from the negative side in the Y-axis direction, when the right front wire 39RF is pulled, torque that causes rotation in the negative direction about the second axis B is applied to the driven pulley 35A.

Similarly, when the right actuator 31R rotates the right drive pulley 37R rightward (hereinafter referred to as negative direction) as viewed from the positive side in the Z-axis direction, the right rear wire 39RR is pulled. Accordingly, as shown in (A) of FIG. 11, torque that causes rotation in the negative direction about the first axis A is applied to the driven pulley 35A. As shown in (B) of FIG. 11, since the right rear wire 39RR is wound rightward around the driven pulley 35A as viewed from the negative side in the Y-axis direction, when the right rear wire 39RR is pulled, torque that causes rotation in the positive direction about the second axis B is applied to the driven pulley 35A.

In this way, the torque about the first axis A applied to the driven pulley 35A when tension is applied to one of the right wire pair 39R is in a direction opposite to that of the torque about the first axis A applied to the driven pulley 35A when tension is applied to the other of the right wire pair 39R. The wire 39 of the left wire pair 39L and the wire 39 of the right wire pair 39R that apply the torque in the same direction about the first axis A to the driven pulley 35A when pulled apply torque in opposite directions about the second axis B to the driven pulley 35A when pulled.

FIG. 12 shows a table summarizing directions of torque applied to the driven pulley 35A from the left wire pair 39L and the right wire pair 39R. In FIG. 12, the positive direction of torque is referred to as "+" and the negative direction as "−".

As can be understood from FIG. 12, when the left drive pulley 37L and the right drive pulley 37R are respectively driven in order to rotate the driven pulley 35A in the same direction as each other about the second axis B, the left wire pair 39L and the right wire pair 39R respectively apply torque in opposite directions about the first axis A to the driven pulley 35A. At this time, with respect to the direction of the second axis B, since the torque that causes rotation in the same direction is applied to the driven pulley 35A from the left wire pair 39L and the right wire pair 39R, the driven pulley 35A rotates in accordance with the direction of the torque. On the other hand, with respect to the direction of the first axis A, since torque in opposite directions is applied respectively from the left wire pair 39L and the right wire pair 39R, rotation of the driven pulley 35A about the first axis A is prevented. Accordingly, the driven pulley 35A only rotates about the second axis B.

Specifically, when the left actuator 31L rotates the left drive pulley 37L in the positive direction and the right actuator 31R rotates the right drive pulley 37R in the negative direction, the driven pulley 35A rotates in the positive direction about the second axis B while rotation of the driven pulley 35A about the first axis A remains prevented. When the left actuator 31L rotates the left drive pulley 37L in the negative direction and the right actuator 31R rotates the right drive pulley 37R in the positive direction, the driven pulley 35A rotates about the second axis B while rotation of the driven pulley 35A about the first axis A remains prevented. Thus, by the power transmission device 1, the driven pulley 35A is freely rotatable in both directions only about the second axis B, and a rotational motion of a joint portion between the palm 11 and the lower arm 9 of the robot arm is realized.

When the left drive pulley 37L and the right drive pulley 37R are respectively driven in order to rotate the driven pulley 35A in opposite directions to each other about the second axis B, the left wire pair 39L and the right wire pair 39R respectively apply torque in the same direction about the first axis A to the driven pulley 35A. At this time, since torque that causes rotation in opposite directions about the first axis A is applied to the driven pulley 35A from the left wire pair 39L and the right wire pair 39R, rotation of the driven pulley 35A about the second axis B is prevented. On the other hand, since torque in the same direction is applied respectively from the left wire pair 39L and the right wire pair 39R about the first axis A, the driven pulley 35A rotates about the first axis A in accordance with the direction of the torque.

Specifically, when the left actuator 31L rotates the left drive pulley 37L in the positive direction and the right actuator 31R rotates the right drive pulley 37R in the positive direction, the driven pulley 35A rotates in the positive direction about the first axis A while rotation of the driven pulley 35A about the second axis B remains prevented. When the left actuator 31L rotates the left drive pulley 37L in the negative direction and the right actuator 31R rotates the right drive pulley 37R in the negative direction, the driven pulley 35A rotates in the negative direction about the first axis A while rotation of the driven pulley 35A about the second axis B remains prevented. Accordingly, the palm 11 is able to be displaced between the extension position and the bending position, and bending and extension of the joint portion between the palm 11 and the lower arm 9 may be realized.

FIG. 13 shows a table summarizing rotation directions of the left and right drive pulleys 37 and modes of rotational driving of the driven member 35. As can be understood from FIG. 13, if the rotation direction of the left drive pulley 37L and the rotation direction of the right drive pulley 37R are the same, the driven member 35 is selectively rotated about the first axis A; if the rotation direction of the left drive pulley 37L and the rotation direction of the right drive pulley 37R are opposite, the driven member 35 is selectively rotated about the second axis B.

In this way, in the power transmission device 1, by controlling the rotation direction of each of the pair of left and right drive pulleys 37, the driven member 35 can be independently rotated about the first axis A and about the second axis B. Since the palm 11 is connected to the lower arm 9 via the driven member 35, the palm 11 is rotatably connected to the lower arm 9 about the first axis A and about the second axis B orthogonal to the first axis A. That is, by the power transmission device 1, the drive device 7 of a wire drive system enabling the palm 11 rotatably connected to the lower arm 9 in two directions (first axis A and second axis B) to be rotated in each direction may be realized.

Particularly, in the power transmission device 1 according to the disclosure, since torque generated by the left actuator 31L and the right actuator 31R is added together and output to the palm 11, the magnitude of torque required for each actuator 31 can be reduced compared to the case of driving by a single actuator 31, and the actuator 31 can be reduced in size.

By using the wire drive system, the actuator 31 can be provided on the base end side of the lower arm 9 away from the first axis A and the second axis B. Thus, there is no need to provide the actuator 31 in a wrist portion, and the wrist portion can be configured to be lightweight and compact. By reducing the weight of the wrist portion, load applied to the left actuator 31L and the right actuator 31R can be reduced, and the left actuator 31L and the right actuator 31R can be reduced in size. Since load torque of the actuator 31 on a root side (shoulder or elbow) of an arm can be reduced due to reduction in weight of the wrist portion, it is possible to reduce the size and weight of the actuator 31 that drives a shoulder joint or an elbow joint.

In the present embodiment, the left horizontal idler pulley 49HL and the right horizontal idler pulley 49HR are of the same shape, and the vertical idler pulley 49V is also of the same shape as above. Hence, torque generated in the intermediate member 33 and the driven member 35 by the drive pulley 37 is equal regardless of left or right and rotation direction. Thus, the torque generated in the driven member 35 may be easily canceled out, a driving operation of the left and right drive pulleys 37 may be simplified, and control of the actuator 31 may be facilitated.

The palm 11 is connected to the driven pulley 35A, and the palm 11 is provided with the finger 13 (assisted drive part) driven by the finger drive wire 19 (linear member). The through hole 43 is provided in the intermediate member 33, and the finger drive wire 19 passes through the through hole 43. In this way, since the finger drive wire 19 is arranged to pass through the through hole 43, the finger drive wire 19 is less likely to protrude from the power transmission device 1, and driving of the palm 11 is less likely to be hindered by the finger drive wire 19.

In the present embodiment, each finger driven pulley 35A has the groove on the outer peripheral surface, and is rotatably supported by the lower arm 9 so that the groove faces the connection portion between the palm 11 and the lower arm 9. Hence, the finger drive wire 19 can be arranged in a generally straight line toward the palm 11. Accordingly, when the finger drive wire 19 is composed of, for example, a control cable including an outer tube and an inner cable, a bending angle of the finger drive wire 19 can be reduced. Accordingly, since friction loss within the control cable can be suppressed and load applied to the finger drive device 27 is reduced, the finger drive device 27 can be reduced in size.

The accommodation hole 25 is formed in the lower arm 9, and a portion (finger driven pulley 27A) of the finger drive device 27 (auxiliary drive device) is accommodated in the accommodation hole 25. In this way, by accommodating a portion of the finger drive device 27 in the accommodation hole 25, the lower arm 9 of the robot can be made compact.

Although a specific embodiment has been described above, the disclosure is not limited to the above embodiment and may be widely modified. The specific configuration, arrangement, quantity, predetermined procedure or the like of each member or portion may be changed as appropriate within the scope of the disclosure. Not all the components shown in the above embodiment are essential, and the components may be selected as appropriate.

In the above embodiment, the left wire pair 39L and the right wire pair 39R are each wound around the intermediate member 33 via the vertical idler pulley 49V. However, the disclosure is not limited to this aspect. For example, the intermediate member 33 may be provided with four grooves, and the left wire pair 39L and the right wire pair 39R may be received in their corresponding grooves.

In the above embodiment, the accommodation hole 25 is provided penetrating the lower arm 9, and the finger drive device 27 is accommodated in the accommodation hole 25. However, a configuration may be employed in which a recess accommodating the finger drive device 27 is provided in the lower arm 9. Accordingly, the lower arm 9 of the robot can be made compact.

In the above embodiment, an example has been described in which the power transmission device 1 is provided at a wrist joint. However, the disclosure is not limited to this aspect. The power transmission device 1 is applicable to any joint of the humanoid robot 3 that rotates on two axes. Specifically, the power transmission device 1 can be applied to, for example, a shoulder joint.

In the above embodiment, the power transmission device 1 is provided in the robot hand 5. However, the power transmission device 1 according to the disclosure can be applied to any machine (for example, a machine tool for welding) having a joint portion that rotates on two axes.

In the above embodiment, an example has been described in which the finger drive wire 19 for driving the finger 13 is passed through the through hole 43 provided in the intermediate member 33. However, the disclosure is not limited thereto. For example, a member passed through the through hole 43 may be any member (linear member) configured in a linear shape. For example, the linear member may be a tube (for example, a supply tube for supplying air or fuel) for driving other mechanisms including the finger 13, or a signal line, or a wire for supplying power.

What is claimed is:

1. A power transmission device, comprising:
a base, provided with a pair of left and right drive pulleys that are independently rotatable;
an intermediate member, rotatably supported by the base about a first axis; and
a driven member, rotatably supported by the intermediate member about a second axis orthogonal to the first axis, wherein
a pair of left wires wound in opposite directions to each other are each fixed to the left drive pulley and the driven member;
a pair of right wires wound in opposite directions to each other are each fixed to the right drive pulley and the driven member;
the left wires and the right wires are wound around the intermediate member in order to apply torque that rotates the driven member about the first axis by rotation of the drive pulleys corresponding thereto;

in response to torque about the second axis applied to the driven member via the left wires by rotation of the left drive pulley and torque about the second axis applied to the driven member via the right wires by rotation of the right drive pulley being in a same direction, torque about the first axis applied to the driven member from the left wires and torque about the first axis applied to the driven member from the right wires are in opposite directions; and in response to the torque about the second axis applied to the driven member via the left wires by rotation of the left drive pulley and the torque about the second axis applied to the driven member via the right wires by rotation of the right drive pulley being in opposite directions, the torque about the first axis applied to the driven member from the left wires and the torque about the first axis applied to the driven member from the right wires are in the same direction.

2. The power transmission device according to claim 1, wherein the torque about the first axis applied to the driven member when tension is applied to one of the left wires is in a direction opposite to the torque about the first axis applied to the driven member when tension is applied to the other of the left wires, and the torque about the first axis applied to the driven member when tension is applied to one of the right wires is in a direction opposite to the torque about the first axis applied to the driven member when tension is applied to the other of the right wires.

3. The power transmission device according to claim 1, wherein the intermediate member comprises a pair of left idler pulleys around which the left wires are respectively wound and a pair of right idler pulleys around which the right wires are respectively wound.

4. The power transmission device according to claim 2, wherein the intermediate member comprises a pair of left idler pulleys around which the left wires are respectively wound and a pair of right idler pulleys around which the right wires are respectively wound.

5. The power transmission device according to claim 3, wherein the intermediate member has a pair of horizontal side surfaces orthogonal to the first axis and facing away from each other, and a pair of vertical side surfaces orthogonal to the horizontal side surfaces and facing away from each other;

on the vertical side surfaces, the pair of left idler pulleys and the pair of right idler pulleys are arranged symmetrically about an imaginary plane orthogonal to the vertical side surfaces and containing the first axis, each being supported on the vertical side surfaces so as to be rotatable about an axis parallel to the vertical side surfaces.

6. The power transmission device according to claim 4, wherein the intermediate member has a pair of horizontal side surfaces orthogonal to the first axis and facing away from each other, and a pair of vertical side surfaces orthogonal to the horizontal side surfaces and facing away from each other;

on the vertical side surfaces, the pair of left idler pulleys and the pair of right idler pulleys are arranged symmetrically about an imaginary plane orthogonal to the vertical side surfaces and containing the first axis, each being supported on the vertical side surfaces so as to be rotatable about an axis parallel to the vertical side surfaces.

7. The power transmission device according to claim 1, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member.

8. The power transmission device according to claim 2, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member.

9. The power transmission device according to claim 3, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member.

10. The power transmission device according to claim 4, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member.

11. The power transmission device according to claim 5, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member.

12. The power transmission device according to claim 6, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member.

13. The power transmission device according to claim 3, further comprising:

a pair of horizontal idler pulleys, coaxial with the first axis and rotatable about the first axis, wherein the left wires and the right wires are respectively wound around the horizontal idler pulleys corresponding thereto between the drive pulleys and the driven member;

the pair of left idler pulleys and the pair of right idler pulleys are all of the same shape; and one of the horizontal idler pulleys is of the same shape as the other of the horizontal idler pulleys.

14. The power transmission device according to claim 1, wherein
the intermediate member is provided with a through hole.

15. The power transmission device according to claim 14, wherein
the driven member is provided with an assisted drive part driven by a linear member; and
the linear member passes through the through hole.

16. The power transmission device according to claim 15, wherein
a recess or an accommodation hole accommodating an auxiliary drive device driving the assisted driven part is formed in the base.

\* \* \* \* \*